O. H. AND A. F. PIEPER.
ELECTRICALLY HEATED RECEPTACLE.
APPLICATION FILED OCT. 26, 1920.
1,404,317.
Patented Jan. 24, 1922.
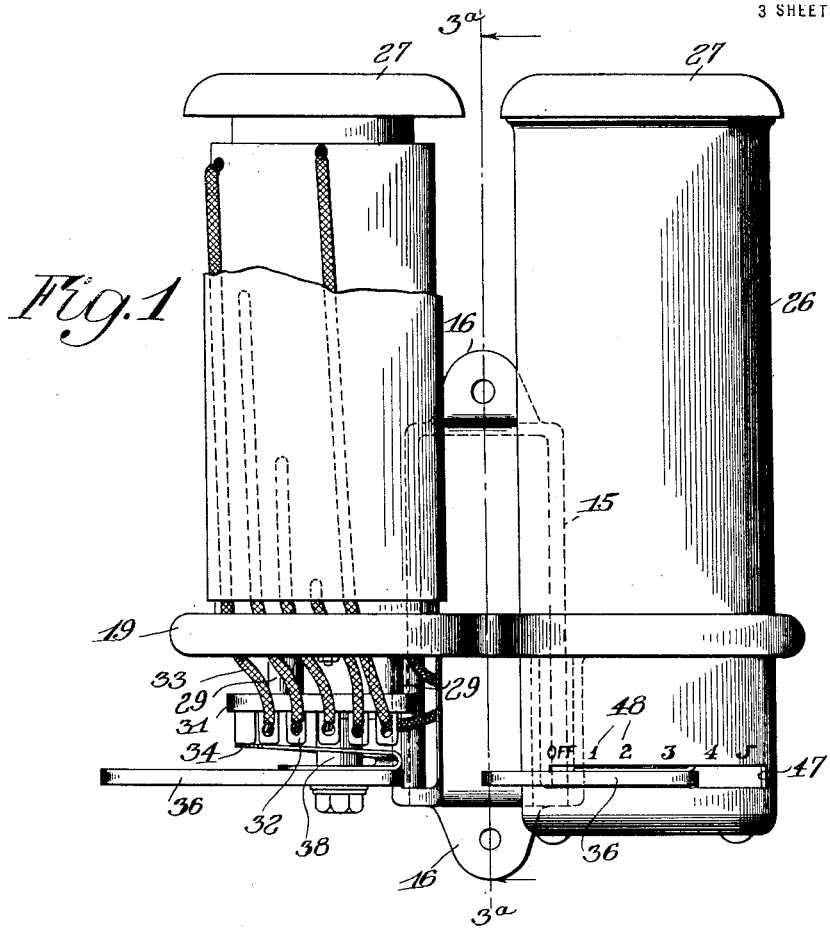
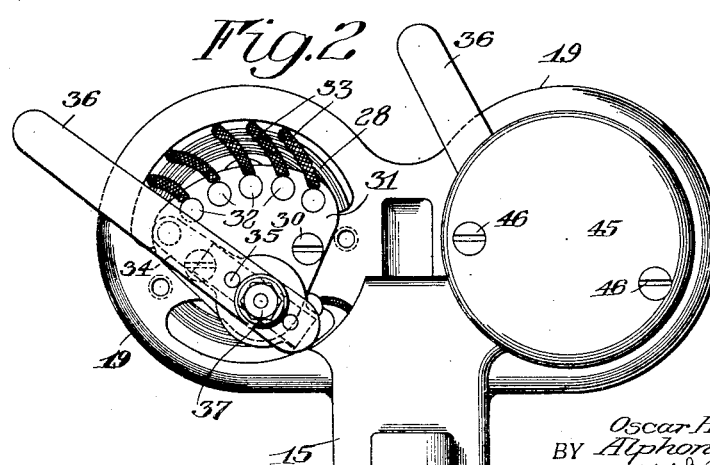
INVENTORS
Oscar H. Pieper
BY Alphonse F. Pieper
their ATTORNEY.

O. H. AND A. F. PIEPER.
ELECTRICALLY HEATED RECEPTACLE.
APPLICATION FILED OCT. 26, 1920.
1,404,317. Patented Jan. 24, 1922.
3 SHEETS—SHEET 2.
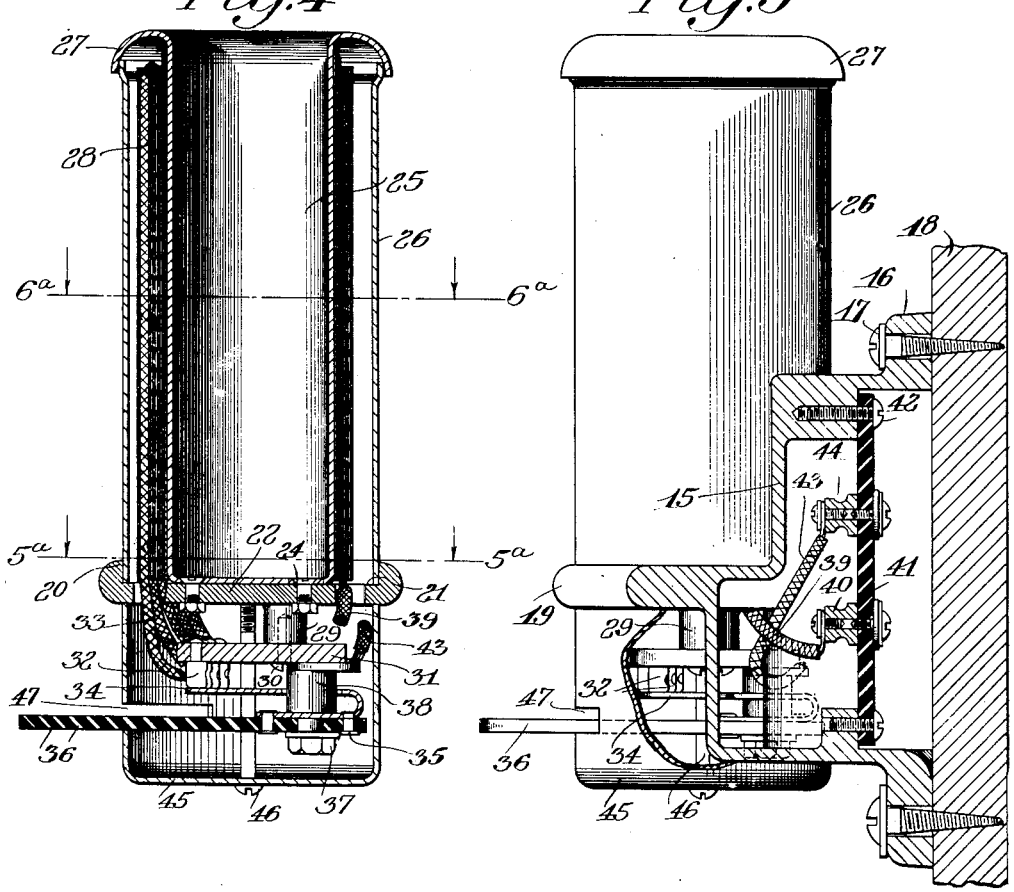
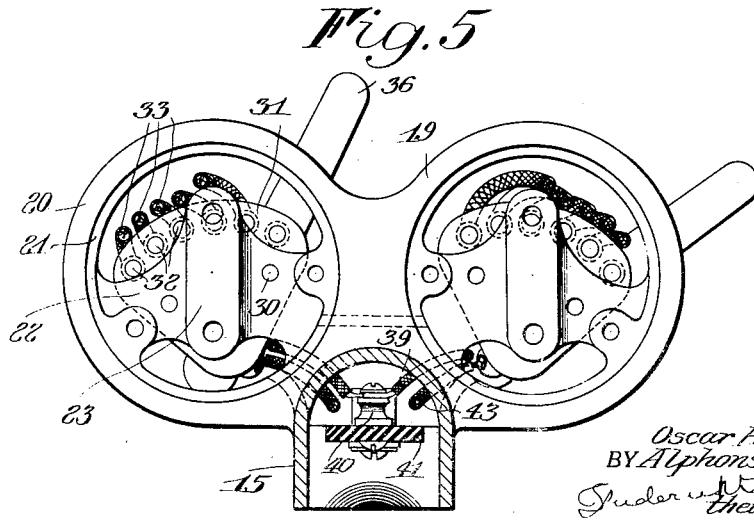
INVENTORS
Oscar H. Pieper
BY Alphonse F. Pieper
their ATTORNEY.

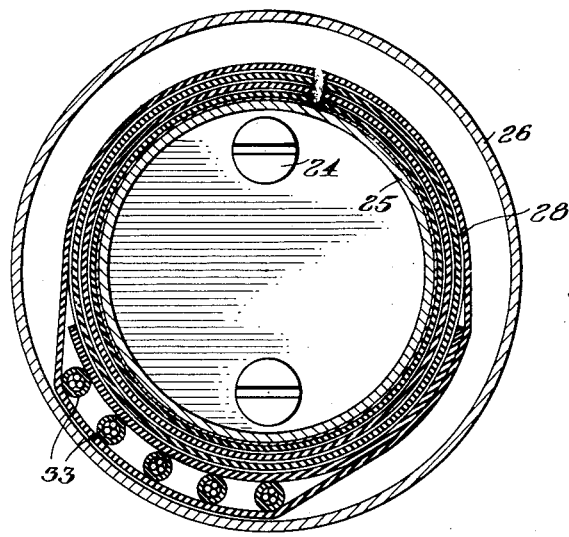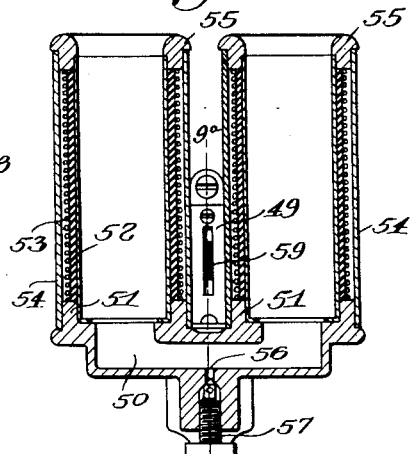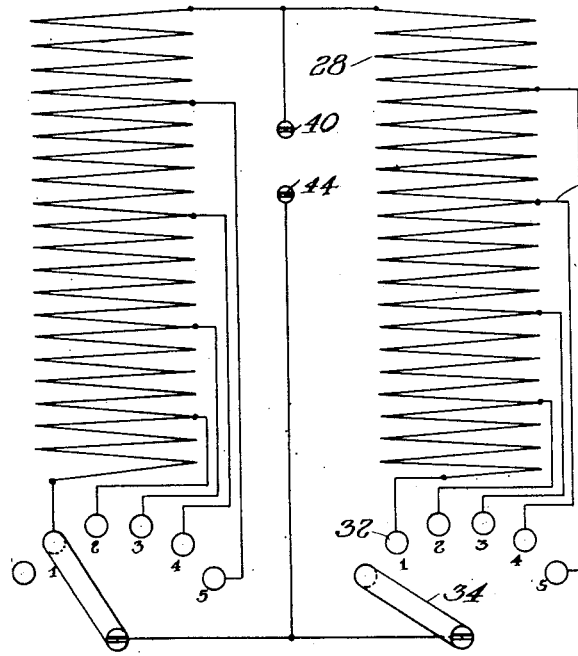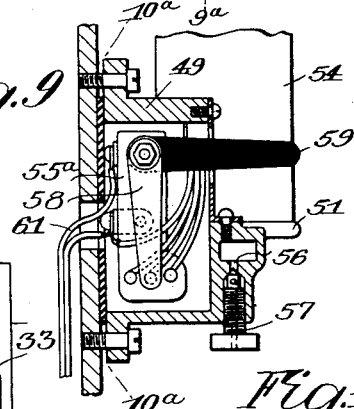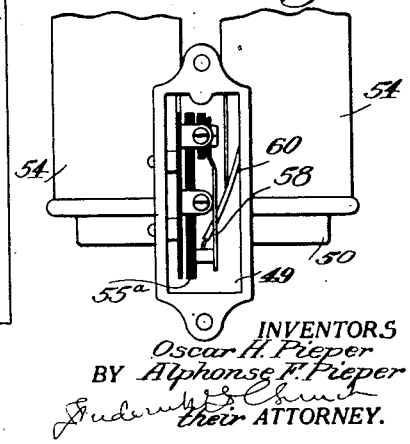

UNITED STATES PATENT OFFICE.

OSCAR H. PIEPER AND ALPHONSE F. PIEPER, OF ROCHESTER, NEW YORK.

ELECTRICALLY-HEATED RECEPTACLE.

1,404,317. Specification of Letters Patent. Patented Jan. 24, 1922.

Application filed October 26, 1920. Serial No. 419,705.

*To all whom it may concern:*

Be it known that we, OSCAR H. PIEPER and ALPHONSE F. PIEPER, of Rochester, in the county of Monroe and State of New York, have invented certain new and useful Improvements in Electrically-Heated Receptacles; and we do hereby declare the following to be a full, clear, and exact description of the same, reference being had to the accompanying drawings, forming a part of this specification, and to the reference-numerals marked thereon.

This invention has to do with electric appliances and relates more particularly to electrically heated receptacles, the chief object being to provide a device of the above character suitable, for example, for use with dental apparatus to heat atomizer fluids and the like, having means for regulating the degree of heat supplied, and which is simple and practical in construction and efficient and convenient in operation. To these and other ends the invention resides in certain improvements and combinations of parts, all as will be hereinafter more fully described, the novel features being pointed out in the claims at the end of the specification.

In the drawings:

Figure 1 is a front elevation partly broken away of a device embodying the present invention.

Figure 2 is a bottom plan view of the same.

Figure 3 is a section on the line 3ª—3ª of Figure 1.

Figure 4 is a longitudinal central section of one of the heating vessels and the switch for controlling the same.

Figure 5 is a section on the line 5ª—5ª of Figure 4.

Figure 6 is an enlarged section on the line 6ª—6ª of Figure 4.

Figure 7 is a diagram illustrating the electrical connections.

Figure 8 is a central vertical section of a modified form of the device.

Figure 9 is a section on the line 9ª—9ª of Figure 8.

Figure 10 is a section on the line 10ª—10ª of Figure 9.

Similar reference numerals throughout the several views indicate the same parts.

The present embodiment of the invention is particularly adapted for attachment to the column or frame of a dental appliance unit such for example as that disclosed in our copending application Serial No. 189,825, filed September 5, 1917, for unitary dental apparatus, for use with the appliances of the unit as for example, for heating the atomizer bottle commonly employed in dental work, the present application being a continuation in part of the above application. The embodiment of the invention herein disclosed is capable of various modifications in construction and mode of operation, the present embodiment being intended merely by way of illustration of the principles of the invention and a preferred practical application thereof as shown in the drawings.

Referring more particularly to Figure 1 there is shown a hollow bracket 15 preferably made as a casting and having the body portion thereof in the substantially semi-circular form shown in section in Figure 5, the top and bottom of the body portion being provided with lugs 16 perforated for the reception of screws or other means 17 for securing the bracket to a vertical wall 18. The bracket is provided with a horizontally extending shelf or arm 19 formed in front and on either side of the body portion of the bracket with a pair of substantially circular portions each having in its upper surface a depression surrounded by a circular upstanding collar 20. The depressed portions are partly cut away to form openings through the arm, leaving an annular shelf 21 within and adjacent each collar, and a bridge portion 22 across the depression.

Secured on a raised portion 23 of each bridge portion 22, as by means of screws or bolts 24, is a cylindrical vessel 25 preferably formed of sheet metal, the vessel being adapted to receive the atomizer bottle commonly used in dental work for heating the contained fluid. In the present instance two such vessels are shown side by side, and as these are the same in construction a description of one applies to both. Surrounding the vessel 25 is a cover or casing preferably in the form of a sheet metal sleeve 26, larger in diameter than the vessel to provide an annular space between the latter and the cover, the vessel preferably having its upper end flanged over to close the said annular space and also to engage the top of the cover to hold the bottom of the latter on the shelf 21 of arm 19 and within the collar 20 thereof which maintains the cover sleeve in position. The vessel is thus provided in effect with spaced inner and outer walls.

For heating the vessel there are preferably coiled about the latter in the space between it and the cover a series of electrical resistance windings 28 arranged in insulated layers, as well understood in the art. These windings extend substantially from top to bottom of the vessel so as to heat the latter uniformly from top to bottom, the windings being tapped at spaced points and there connected with a series of contacts of a switch for controlling the degree of heat and with a source of power as hereafter described.

The switch means for connecting varying portions of the resistance windings in the circuit to regulate the degree of heat supplied to the vessel comprises preferably a pair of lugs 29 depending from the under side of arm 19 and having secured thereto, as by means of screws 30, a member 31 of any suitable insulating material on the under side of which are fixed a series of contacts 32, in the present instance six in number, arranged on the arc of a circle and each having connected therewith the corresponding one of a series of leads 33 tapping the resistance windings, except that the first contact is unconnected and corresponds to the "off" position of the switch. Movable over the contacts for successive electrical connection therewith is a switch arm 34 preferably of resilient metal bent on itself and secured as by means of rivets 35 to a handle or lever 36 of insulating material rotatably secured, as by means of a nut 37, on a metal post 38 fixed in the member 31. By moving the switch handle on its pivot the switch arm 34 of course may be moved over the contacts 32 for establishing electrical connection with a selected one of the latter.

A conductor 39, Figures 3 and 4, is preferably connected to one end of each resistance winding and to a common binding post 40 on an insulating member 41 fixed as by means of screws 42 within the hollow portion of the bracket. A conductor 43 is connected with a lug on the pivot post 38 of each switch arm and with a common binding post 44 on member 41, the two binding posts being arranged for connection with the respective sides of a suitable source of power, the leads of which may be conveniently carried thereto through an opening (not shown) in wall 18.

A protective housing is provided for the above switch parts comprising a cylindrical sheet metal portion 45 removably secured as by means of long screws 46 to the under side of the bracket arm, the housing being preferably provided with a slot 47 through which the switch lever or handle 36 projects for the convenient operation of the switch, and the housing is marked as at 48, Figure 1, with suitable indicia to indicate the various positions of adjustment of the switch, the left hand position of which disconnects the resistance windings altogether while the other successively numbered positions to which the switch arm may be moved correspond with the various contacts 32 connected at different points to the resistance winding so that the current may be supplied to a greater or less proportion of the latter as determined by the degree of heat desired. In this embodiment of the invention each vessel is provided with a separate controlling switch for regulation independently of the other, and each switch has five positions of adjustment so that the temperature within the vessel may be closely regulated to the degree desired. The above electrical connections are shown diagrammatically in Figure 7.

In Figures 8, 9 and 10 is shown a modified form of the invention in which a pair of vessels is provided as before and supported on a hollow bracket 49 having a hollow arm 50 provided with collars 51 within which are fitted sleeves 52 carrying the resistance windings 53. The latter are surrounded by sheaths or covers 54 united at their upper ends with the inner sleeves 52 by means of collars 55. In this form of the invention the opening in the hollow arm 50 communicates with the interior of each vessel, and leading therefrom is an opening 56 closed by screw plug 57 which may be opened to drain the vessel in the event that fluid is inadvertently accumulated therein. The current of the resistance windings 53 is controlled by a common switch in this modification and the switch is provided with but three contacts carried by a vertically arranged insulating member 55$^a$ housed within the bracket between the two vessels. Cooperating with these contacts is a switch arm 58 pivotally supported on the insulating member 55$^a$ for movement in a vertical plane and adjustable by a handle 59 projecting forwardly through the bracket between the vessels. One end of the resistance windings of each vessel is connected by a wire 60 to one side of the line, the other side of which is connected by a wire 61 with switch arm 58, in the general manner previously described.

As apparent from the drawings and the above description, the apparatus is of a simple and practical form of construction, economical to manufacture and assemble, and the construction and arrangement of the various parts is such as to afford a device which is convenient to control and which accomplishes the desired results in an efficient manner.

We claim as our invention:

1. An electrically heated receptacle comprising a supporting bracket, a vessel on said bracket, resistance windings disposed adjacent the walls of said vessel, a cover for said windings, a switch on said bracket provided with a plurality of contacts connected with said windings at different points of the latter, and a switch arm movable over said contacts to include different portions of said windings in circuit, and connections from said windings and switch to a source of power.

2. An electrically heated receptacle comprising a supporting bracket, a vessel on said bracket, resistance windings disposed adjacent the walls of said vessel, a cover for said windings, a housing on said bracket, an insulating member in said housing, a plurality of contacts on said member connected with said windings at different points on the latter, a switch arm pivotally mounted on said member for movement over said contacts to include different portions of said windings in circuit, and connections from said windings and switch arm to a source of power.

3. An electrically heated receptacle comprising a supporting bracket having an arm, a vessel on said arm having spaced inner and outer walls supported at the bottom on said arm with a closure at the top for the space therebetween, a collar on said arm for holding the outer wall in position, resistance windings located between said walls, a switch on said bracket having a plurality of contacts connected with said windings at different points of the latter, and a switch arm movable over said contacts to include different portions of said windings in circuit, and connections from said windings and switch arm to a source of power.

4. An electric heating device comprising a hollow supporting bracket, a plurality of vessels carried thereby, resistance windings disposed adjacent the walls of said vessels to heat the same, protective coverings for said windings, switch apparatus on said bracket arranged to connect varying proportions of said windings in circuit and provided with housing means, and connections from said windings and switch apparatus extending through said bracket to a source of power.

5. An electrically heated receptacle comprising a supporting bracket having an arm, a vessel carried on the upper side of said arm having spaced inner and outer walls connected by a closure at the top, resistance coils wound about said vessel between said walls, a switch on said bracket having a plurality of contacts connected to different points of said windings and a switch arm movable over said contacts, a housing for said switch, a lever for moving said switch arm projecting through a slot in said housing, and connections from said windings and switch to a source of power.

6. An electrically heated receptacle comprising a supporting bracket having an arm, a vessel carried on the upper side of said arm having spaced inner and outer walls connected by a closure at the top, resistance coils between the walls of said vessel to heat the same, an insulating member carried on the under side of said arm substantially parallel therewith and provided with a plurality of switch contacts connected to different points of said windings, a switch arm pivotally supported on said member for movement over said contacts, a housing for said switch parts on the under side of said arm, a lever for moving said switch arm projecting through a slot in said housing, and connections from said windings and switch arm extending through said housing and bracket to a source of power.

7. An electrically heated receptacle comprising a supporting bracket having an arm, a cylindrical sheet metal vessel on said arm, a sheet metal cover for the sides for said vessel spaced therefrom, said vessel having at its top a flange extending over said cover to hold the latter in place, resistance windings extending from top to bottom of said vessel between the latter and said cover, a switch on the under side of said arm having a plurality of contacts connected to different points of said windings and a contact arm movable over said contacts, a sheet metal housing for said switch, a lever for moving said switch arm projecting through a slot in said housing, and connections from said electrical parts extending through said housing and bracket to a source of power.

8. An electrically heated receptacle comprising a hollow supporting bracket having an arm, a cylindrical sheet metal vessel secured at its bottom to said arm, a sheet metal casing surrounding said vessel and spaced therefrom, a flange on one of said sheet metal parts connecting the tops of the latter, a collar on said arm for securing said casing in position, a switch below said arm arranged to vary the proportion of said windings included in circuit, a sheet metal housing for said switch, means for operating the latter, and connections from said electrical parts extending through said housing and bracket to a source of power.

OSCAR H. PIEPER.
ALPHONSE F. PIEPER.